J. G. PETERSON.
PUSH SWITCH.
APPLICATION FILED APR. 28, 1909.

954,461.

Patented Apr. 12, 1910.
3 SHEETS—SHEET 1.

WITNESSES:
Howard L. Holcomb
Josephine M. Strempfer.

INVENTOR:
Johann G. Peterson
Harry P. Williams
atty.

J. G. PETERSON.
PUSH SWITCH.
APPLICATION FILED APR. 28, 1909.
954,461.
Patented Apr. 12, 1910.
3 SHEETS—SHEET 2.
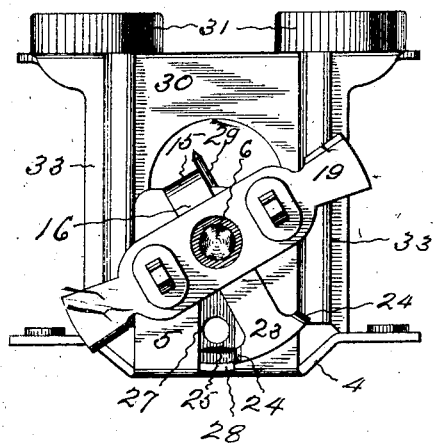
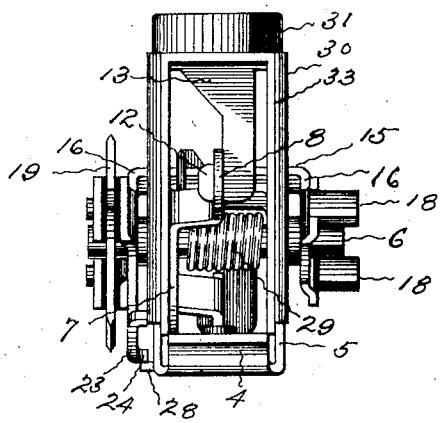
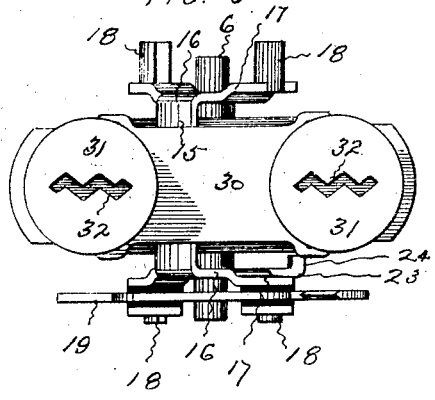
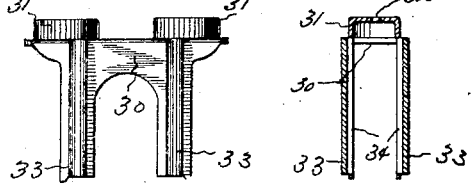
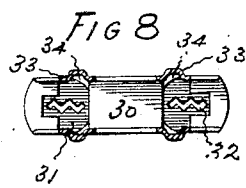
WITNESSES:
Howard L. Holcomb
Josephine M. Strempfer
INVENTOR:
John G. Peterson,
by Harry P. Williams
atty.

J. G. PETERSON.
PUSH SWITCH.
APPLICATION FILED APR. 28, 1909.
954,461.
Patented Apr. 12, 1910.
3 SHEETS—SHEET 3.
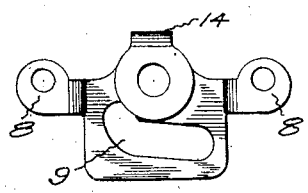
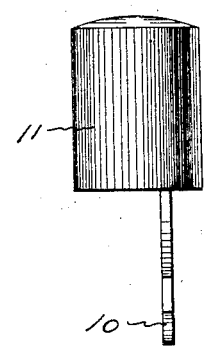
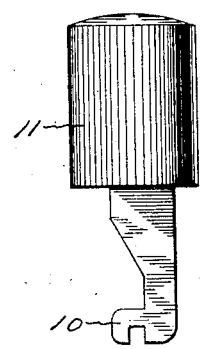
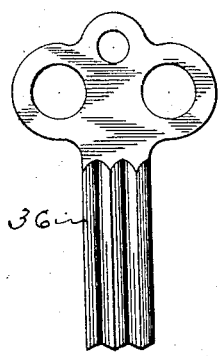
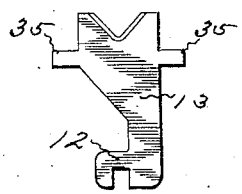
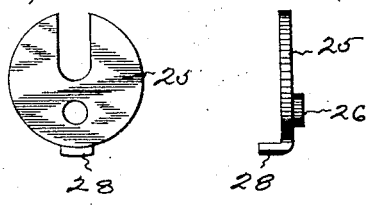
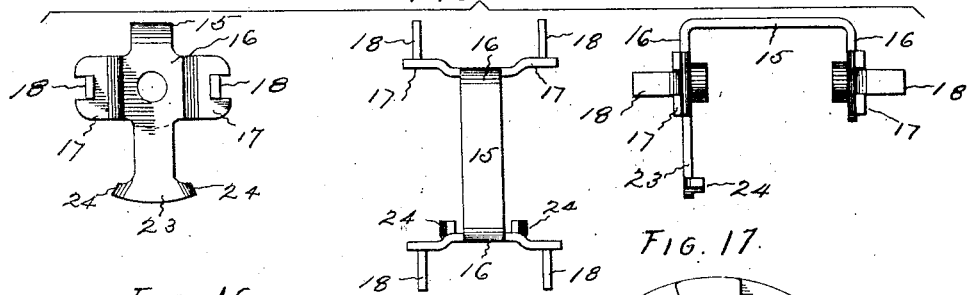
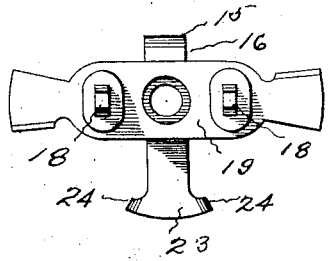
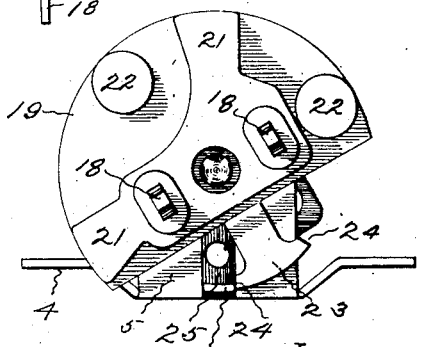
WITNESSES:
Howard L. Holcomb
Josephine M. Strempfer
INVENTOR
Johann G. Peterson
by
Harry R. Williams
atty.

UNITED STATES PATENT OFFICE.

JOHANN G. PETERSON, OF HARTFORD, CONNECTICUT, ASSIGNOR TO THE ARROW ELECTRIC COMPANY, OF HARTFORD, CONNECTICUT, A CORPORATION OF CONNECTICUT.

PUSH-SWITCH.

954,461.   Specification of Letters Patent.   Patented Apr. 12, 1910.

Application filed April 28, 1909. Serial No. 492,631.

*To all whom it may concern:*

Be it known that I, JOHANN G. PETERSON, a citizen of the United States, residing at Hartford, in the county of Hartford and State of Connecticut, have invented a new and useful Improvement in Push-Switches, of which the following is a specification.

This invention relates to an electric switch which is so constructed that it may be arranged to be operated for opening and closing one or more circuits, by means of movable push buttons, or by a special form of key or a removable button.

The object of the invention is to produce an efficient and approved switch of this character, which is very simple and cheap to manufacture and to assemble with either the ordinary movable push buttons for actuating the mechanism, or with fixed buttons and a removable key.

Figure 1:
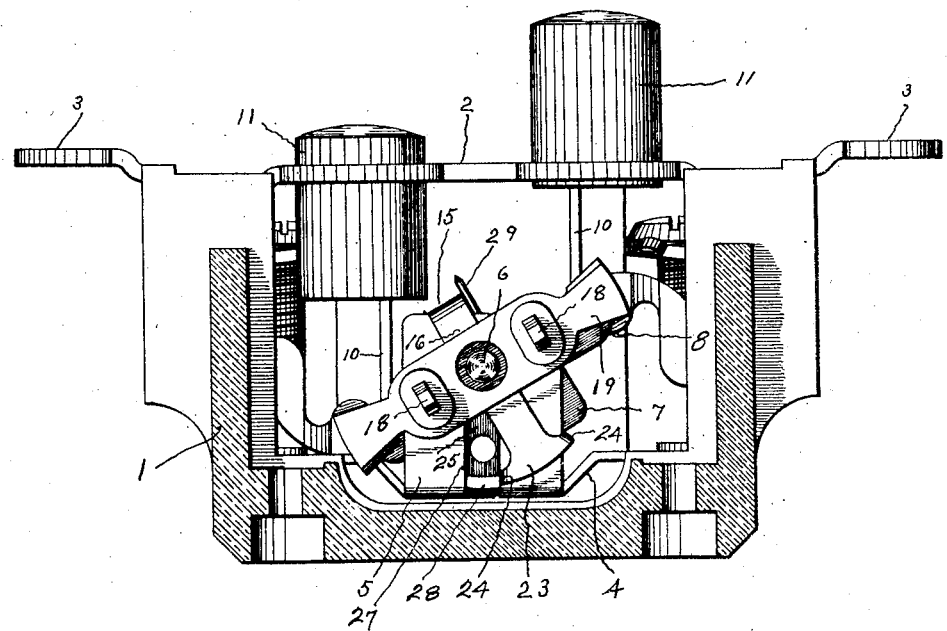
Figure 2:
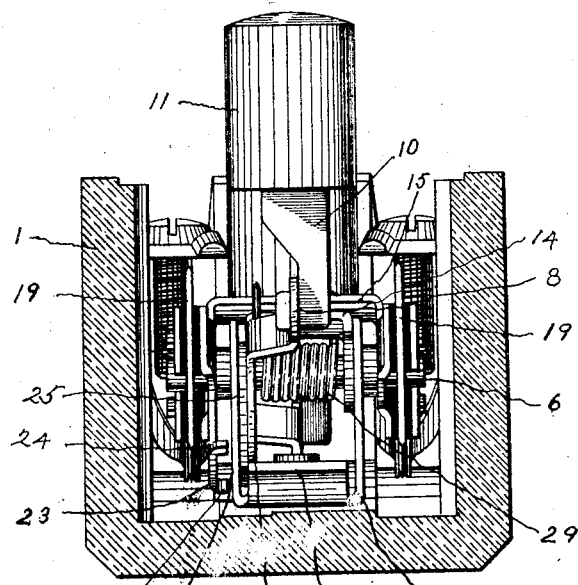

Figure 1 of the accompanying drawings shows a side elevation of the switch mechanism, arranged with movable push buttons, the receptacle being cut in longitudinal section. Fig. 2 shows an edge view of the same mechanism with the receptacle cut in transverse section. Fig. 3 shows a side elevation of the mechanism arranged with fixed buttons that are provided with key slots. Fig. 4 shows an edge view of the mechanism with the fixed key buttons. Fig. 5 shows a plan of the same. Fig. 6 shows a side view of the key button frame. Fig. 7 shows a vertical section of the key button frame. Fig. 8 shows a horizontal section of this frame. Fig. 9 shows a face view of the actuating rocker and cam plate. Fig. 10 shows a side view of one of the movable push buttons that may be connected with the rocker. Fig. 11 shows an edge view of the button. Fig. 12 shows a side view of a key that may be used instead of the buttons for moving the rocker. Fig. 13 shows a side view of the key plate that is substituted for a button shank when the mechanism is to be assembled as a lock switch and operated by a key. Fig. 14 shows side, top and edge views of the pole carrying and lock plate. Fig. 15 shows face and edge views of the latch plate. Fig. 16 shows a side elevation of the pole carrying plate with the movable contacts arranged for three-point connections. Fig. 17 shows a side view of the mechanism with the contacts arranged for four-point connections.

The receptacle 1, which is shown, is preferably made of porcelain of the usual size and shape, and fastened across the open end of the receptacle is a bridge or button guiding plate 2, having ears 3, by means of which the switch is attached to the wall box or other support, and to which the ordinary face plate is attached.

The mechanism supporting frame has a base 4 that is adapted to be fastened to the bottom of the inside of the receptacle, and sides 5 that project upwardly at right angles from the base. These parts, the base and the sides, of the frame are desirably stamped from a single piece of metal. Loosely supported by the sides of the frame is an arbor 6. Mounted on this arbor, between the sides of the frame, is the rocker plate 7. This rocker has two outwardly projecting perforated arms 8 and a cam slot 9. The ends of the shanks 10 of the push buttons 11 are engaged with these perforated arms if the mechanism is to be assembled for use as an ordinary push button switch. If the mechanism is to be assembled for use as a lock switch, the ends 12 of the key plate 13 are engaged with the perforated arms of the rocker. The rocker plate has an arm 14, which extends parallel with the spindle and then turns down. This turned down end is perforated to fit the spindle and aid in supporting the rocker.

The yoke shaped pole carrying and locking plate is formed of a single piece of material bent so as to span the ends of the supporting frame. The central portion or neck 15 of the yoke extends parallel with the spindle, while the ends 16 turn down and are perforated to fit upon the spindle. Projecting outwardly from each of the end plates of this part are arms 17, provided with forwardly extending lugs 18. Mounted upon these lugs and suitably insulated therefrom, are the movable contact plates or poles 19. If the mechanism is to be assembled for use as a double pole switch, a pole plate is mounted upon each end of the pole carrying plate so as to move simultaneously and parallel on each side of the supporting frame when the mechanism is operated, as shown in Fig. 2. If the mechanism is to be used as a single pole switch, one of these pole plates is omitted. If it is designed for a double pole switch, the pole plates extend parallel in the same direction. For a three-point switch, the pole plates are mounted to extend parallel with each other, as shown in Fig. 16. If the mechanism is to be assembled as a four-point switch, an insulating disk 20, provided with a conducting contact having two arms 21, and two single contacts 22 may be attached to the pole plate, as shown in Fig. 17.

Extending from the pole carrying plate, and formed integral therewith, is the lock arm 23. It is desirable to provide the end of this arm with inwardly projecting lugs 24. Mounted between one side of the supporting frame and the rocker is the latch plate 25. This plate is slotted so as to embrace and be guided in its movement by the spindle. Projecting from this plate into the cam slot of the rocker is a stud 26; and projecting in the opposite direction through a slot 27 in the supporting frame is a lug 28. This lug normally lies in the path of the lugs which project inwardly from the lock arm.

Coiled about the spindle between the ends of the rocker plate is a spiral spring 29. This spring is placed under tension and one end thrusts in one direction against the edges of the rocker arm 14 and the neck 15 of the pole plate yoke, while the other end of the spring thrusts in the opposite direction against the other edges of these parts, in the usual manner.

When the upper end of the rocker is pushed down, one end of the spring is moved by the rocker arm 14 and the tension of the spring increased until the cam slot of the rocker acting on the stud of the latch plate, moves the latch sufficiently far for the lug of the latch plate to be moved out of the path of the lugs of the lock plate. When the lock plate is released the other end of the spring thrusting against the neck 15 throws the pole carrying and lock plate and oscillates the poles for making or breaking the circuit, according to the conditions.

In case the mechanism is to be assembled for use as an ordinary push button switch, as above described, the shanks of the push buttons are hooked into the perforated ends of the rocker. If the mechanism is to be assembled for use as a lock switch, as above described, the key plates are hooked into the perforated ends of the rocker. After the key plates have been thus engaged with the rocker, a frame 30, provided with fixed buttons 31 having key slots 32, is applied to the supporting frame. This button frame has downwardly extending legs 33, which are provided with longitudinally extending grooves 34. These grooves which preferably are stamped in the legs, are designed to receive the lugs 35 that project from the edges of the key plates for the purpose of guiding the plates in their movements. The outside walls of this frame each side of these grooves are shaped so as to guide the button frame and hold it in position when it is applied to the supporting frame. When the parts are assembled in this manner, a key 36 may be inserted through the key slots of the fixed buttons and pressed inwardly against the key plates for the purpose of actuating the mechanism.

This invention provides a switch mechanism which, without change, may be assembled with parts whereby it will operate as an ordinary single pole, double pole, three-point or four-point push button switch, or may be assembled with parts whereby it may be operated as a single pole, double pole, three-point or four-point lock switch. The shanks of the push buttons or the key plates, as the case may be, are attached to the rocker by simply hooking them together, without the aid of rivets or tools. The fixed button frame is applied to the supporting frame and held firmly, without the aid of tools or fastening means. The arbor is loosely held in position without other retaining means than the walls of the receptacle. The cam plate or rocker with its cam slot and means for the attachment of the push buttons or key plates is formed of a single piece, and is loosely mounted on the arbor. The pole carrying and lock plate is formed from a single piece of material bent to shape with its arms and lugs for supporting one or more pole plates, and with the locking lugs which are engaged by the latch lug. The latch plate with its latch lug and cam stud is also formed of a single piece of metal, and is loosely held in place and guided by the arbor and by the slot in the supporting frame.

The invention claimed is:

1. An electric switch having a supporting frame, an arbor mounted in said frame, a rocker having a cam slot mounted on the arbor, a pole carrying plate mounted on the arbor, said pole carrying plate having an arm with locking lugs, poles mounted on said carrying plate, a spring coiled upon the arbor and having its opposite ends engaging opposite sides of a part of the rocker and a part of the pole carrying and locking plate, a latch plate, said latch plate having a stud engaging the cam slot of the rocker, also a lug extending through a slot in the supporting frame and normally lying in the path of the locking lugs, and also a part loosely embracing the arbor whereby the latch plate is guided in its movement by the latch lug and the arbor, and means for oscillating the rocker.

2. An electric switch having a supporting frame, an arbor mounted in said frame, a rocker mounted on the arbor, a pole carrying and locking plate mounted on the arbor, a latch plate normally engaging the lock plate and adapted to be moved by the rocker, a spring adapted to be made tense by the movement of the rocker for throwing the pole carrying and locking plate, key plates detachably connected with the rocker, and buttons detachably connected with the supporting frame and having key slots arranged in line with the key plates.

3. An electric switch having a supporting frame, an arbor mounted in said frame, a rocker mounted on the arbor, a pole carrying and locking plate mounted on the arbor, a latch plate normally engaging the lock plate and adapted to be moved by the rocker, a spring adapted to be made tense by the movement of the rocker for throwing the pole carrying and locking plate, key plates detachably connected with the rocker, a frame detachably applied to the supporting frame for supporting and guiding the key plates, and buttons attached to said detachable frame and provided with key slots in line with the key plates.

4. An electric switch having a supporting frame, an arbor mounted in said frame, a rocker plate mounted on the arbor, a pole carrying plate mounted on the arbor, a latch actuated by the rocker plate for holding and releasing the pole carrying plate, a spring for throwing the pole carrying plate when the latch releases said plate, a button frame removably connected with the supporting frame, buttons with key slots secured to the button frame, and key plates connected with the rocker plate in line with the key slots.

JOHANN G. PETERSON.

Witnesses:
JOSEPHINE M. STREMPFER,
H. R. WILLIAMS.